United States Patent
Hwang

(10) Patent No.: US 6,600,519 B1
(45) Date of Patent: Jul. 29, 2003

(54) BLACK LEVEL STRETCHING APPARATUS AND METHOD CAPABLE OF MINIMIZING FLICKER

(75) Inventor: Injun Hwang, Seoul (KR)

(73) Assignee: Samsung Electronics Co., Ltd. (KR)

(*) Notice: Subject to any disclaimer, the term of this patent is extended or adjusted under 35 U.S.C. 154(b) by 417 days.

(21) Appl. No.: 09/704,988

(22) Filed: Nov. 2, 2000

(30) Foreign Application Priority Data

Nov. 4, 1999 (KR) ......................................... 1999-48597
Oct. 26, 2000 (KR) ......................................... 2000-63177

(51) Int. Cl.[7] .............................. H04N 5/14; H04N 5/57
(52) U.S. Cl. ........................ 348/673; 348/678; 348/687; 348/29; 348/910
(58) Field of Search ................................ 348/673, 678, 348/687, 910, 607, 688, 686, 28, 602, 603, 704; 345/698, 690, 77; 358/3.26, 3.27, 446, 447; 382/260, 261, 263, 264, 274

(56) References Cited

U.S. PATENT DOCUMENTS

| | | | |
|---|---|---|---|
| 4,187,519 A | * 2/1980 | Vitols et al. | 348/28 |
| 4,204,229 A | * 5/1980 | Heuze | 348/683 |
| 4,589,025 A | * 5/1986 | Monahan et al. | 348/243 |
| 4,654,710 A | * 3/1987 | Richard | 348/674 |
| 4,937,671 A | 6/1990 | Engel | 358/169 |
| 4,975,773 A | 12/1990 | Rabii | 358/169 |
| 5,018,012 A | * 5/1991 | Tsuji | 348/691 |
| 5,162,902 A | * 11/1992 | Bell et al. | 348/678 |
| 5,166,795 A | * 11/1992 | Lee et al. | 348/687 |
| 5,191,420 A | * 3/1993 | Lagoni et al. | 348/687 |
| 5,262,862 A | * 11/1993 | Sadamatsu et al. | 348/679 |
| 5,422,680 A | 6/1995 | Lagoni et al. | 348/674 |
| 5,515,113 A | 5/1996 | Takeshima | 348/687 |
| 5,517,242 A | * 5/1996 | Yamada et al. | 348/254 |
| 5,539,425 A | * 7/1996 | Kamaguchi et al. | 345/77 |
| 5,748,257 A | * 5/1998 | Kawabata et al. | 348/615 |
| 5,959,696 A | * 9/1999 | Hwang | 348/678 |
| 6,518,998 B1 | * 2/2003 | Christoff et al. | 348/216.1 |

FOREIGN PATENT DOCUMENTS

EP 0 390 179 10/1990 ............ H04N/5/57

* cited by examiner

*Primary Examiner*—John Miller
*Assistant Examiner*—Jean W. Désir
(74) *Attorney, Agent, or Firm*—Mills & Onello LLP

(57) ABSTRACT

An apparatus and method for stretching the black level of an image signal to minimize flicker are provided. A black level stretching apparatus includes a minimum and maximum value extraction unit, and an adaptive black level stretch unit. The minimum and maximum value extraction unit for extracting the minimum and maximum values of each field of an image signal removes impulse noise using at least one low-pass-filter. The adaptive black level stretch unit extracts a tilt point, which delimits a dark region that is stretched, calculates a first gradient, selects the first gradient or a second gradient defined by users according to the dynamic range of the input signal, and stretches the black level of the image signal using the selected gradient. Another black level stretching apparatus includes a minimum value extraction unit, a dark region average value extractor, and a black level stretch unit. The minimum value extraction unit extracts and outputs the minimum value of each field of an image signal. The dark region average value extractor for extracting the average value of the image signal levels of each field, which belong to a dark portion of the field, removes impulse noise using at least one low-pass filter. The black level stretch unit calculates a pre-gradient and a gradient, which is obtained by multiplying the pre-gradient by a predetermined gradient gain, and stretches the black level of the image signal using the gradient. The black level stretching apparatus and method are effective in minimizing flicker caused by caption data.

18 Claims, 10 Drawing Sheets

BLACK LEVEL STRETCHING APPARATUS AND METHOD CAPABLE OF MINIMIZING FLICKER

BACKGROUND OF THE INVENTION

1. Field of the Invention

The present invention relates to a black level stretching apparatus for image signal processing systems, and more particularly, to an apparatus and method for stretching the black level of an image signal, which are capable of eliminating flicker caused by a sudden change in image signal levels.

2. Description of the Related Art

In general, the dynamic range of an input image signal is narrower than the fixed range of the hardware for processing image signals. Here, the fixed range of the hardware means the range from the minimum level to the maximum level of an image signal, which can be displayed by an image signal processing system. When an image signal whose dynamic range is narrower than the range of the hardware is input to an image signal processing system, the dynamic range of the image signal is stretched close to the range of the hardware, to thereby increase the resolution of the image signal.

On the other hand, the image quality is more important in dark regions than bright regions of a screen, so approaches have been made to increase the resolution of the dark region. Increasing the resolution of dark region of a screen is referred to as "black stretching" or "black expanding". In addition, when almost no image signal exists in the dark region, the entire screen seems white and dull. In other words, when the dynamic range of the image signal is concentrated on the bright region, the dynamic range of the image signal in the dark ("black") region is expanded so as to improve the image quality. The term "image signal" used through this specification refers to the "brightness" of the image signal, which is one of a variety of signals used to express the image.

There are two typical black level stretching techniques. A first method is to detect the minimum and maximum values in the dynamic range of an input image signal, calculate a tilt point, from which black level stretching starts, and stretch the image signal whose level is lower than the tilt point in proportion to the difference between the tilt point and the levels of the image signal. This conventional black level stretching technique is illustrated in FIG. 1. As shown in FIG. 1, a tilt point Yt, from which black level stretching starts, is calculated by formula (1):

$$Yt = Y\min + RT*(Y\max - Y\min) \qquad (1)$$

where Ymin represents the minimum value of an input image signal Yin, RT represents a ratio of dark region to the entire dynamic range of the input image signal, and Ymax represents the maximum value of the input image signal Yin.

In the black level stretching method illustrated in FIG. 1, the black level of the image signal Yin is expanded using a predetermined gradient, for example, G1, G2 or G3, in accordance with the dynamic range of the input image signal Yin irrespective of the hardware range of the image processing system used, as expressed by formula (2):

$$Yout = Yin + G*(Yin - Yt) \qquad (2)$$

where Yout represents the result of black level stretching of the input image signal Yin, and G represents a predetermined gradient, for example, G1, G2 or G3. In FIG. 1, dashed lines 12, 14 and 16 represent the results of black level stretching of the input image signal Yin using gradients G1, G2 and G3, respectively. In other words, the black level below the tilt point Yt is expanded in proportion to the difference between the black level of the input image signal Yin and the tilt point Yt.

In the case where a screen has a consistent dark tone, for example, when a night scene is displayed, i.e., the dynamic range of an input image signal is narrow, the black level of the image signal is slightly stretched. Meanwhile, when a larger amount of contrast appears in a displayed image, i.e., when the dynamic range of an input image signal is wide, the black level of the image signal is more widely stretched, thereby displaying a more distinct image. However, even when there is no need to stretch the dark region, i.e., when the dynamic range of the input image signal is as wide as the range of the hardware, the black level can be undesirably stretched. In this case, almost all signal levels of the dark region become lower than the minimum value of the hardware range, so that image detail in the dark region cannot be seen.

On the other hand, a second black level stretching technique is to stretch the minimum value Ymin of a screen to the minimum level of the hardware range, thereby stretching the dark region below the tilt point Yt. The second black level stretching technique is illustrated in FIG. 2. As shown in FIG. 2, the minimum value Ymin of a screen is always stretched to the minimum level of the fixed hardware range to stretch the black level of the image signal, as expressed by formula (3):

$$Yout = \frac{Yt}{Yt - Y\min} * (Yin - Yt) + Yt \qquad (3)$$

where $$\frac{Yt}{Yt - Y\min}$$

is the gradient of the line 22, which is calculated using two points B and Yt. The right term of formula (2) can be rearranged in a similar way to formula (2), as expressed by formula (4):

$$Yout = Yin + \left(\frac{Yt}{Yt - Y\min} - 1\right) * (Yin - Yt) \qquad (4)$$

where $$\frac{Yt}{Yt - Y\min} - 1$$

corresponds to the gradient G of formula (2).

In the second black level stretching technique, the minimum level of signal to which the signal is stretched cannot be lowered than the minimum level of the hardware range, i.e., zero. For this reason, unlike the first conventional black expansion technique, although an image signal having a wide dynamic range is input, the black level stretched signal does not drop beyond the minimum level of the hardware range. However, even for an input image signal having a narrow dynamic range, such as a night scene having a consistent tone, the minimum value Ymin of the image signal is also dropped to the minimum level of the hardware range, to thereby stretch the black level of the signal. As a result, the dark region of the screen becomes dull.

Both the first and second black level stretching techniques described above cause an error in extracting the minimum and maximum values of a screen due to impulse noise present in the screen, so that flicker occurs. In addition, when a continuous black or white level signal, such as caption data, is displayed in a particular place of the screen, the extraction of the minimum and maximum values of the screen is adversely affected by the displayed black or white level signal. As a result, black level stretching cannot be accurately performed.

SUMMARY OF THE INVENTION

To solve the above problems, it is a first objective of the present invention to provide an apparatus and method for adaptively stretching the black level of an input image signal according to the dynamic range of the input image signal, so that occurrence of flickering in black level stretching, which is caused due to impulse noise or caption data, can be minimized.

It is a second objective of the present invention to provide a black level stretching apparatus and method, in which the range of black stretching is varied by users and the occurrence of flickering in black level stretching, which is caused due to impulse noise or caption data, can be minimized.

According to an aspect of the first objective of the present invention, there is provided an adaptive black level stretching apparatus comprising: a minimum and maximum value extraction unit for receiving an image signal, extracting the minimum and maximum values of each field of the image signal, and outputting the extracted minimum and maximum values as field minimum and maximum values, respectively; and an adaptive black level stretch unit for (i) calculating a tilt point which delimits a dark region that is stretched using the field minimum and maximum values, (ii) calculating a first gradient for use in stretching the field minimum value to a predetermined value using the field minimum value and the tilt point, (iii) selecting the first gradient or a second gradient defined by users according to the dynamic range of the image signal, and (iv) stretching the black level of the image signal using the selected gradient.

In another embodiment, the adaptive black level stretching apparatus comprises: a first low-pass filter unit for low-pass-filtering an image signal to remove impulse noise present in lines, and extracting the line minimum and maximum values of each line from the low-pass-filtered image signal; a second low-pass-filter unit for low-pass-filtering the line minimum and maximum values, extracting the minimum and maximum values from the low-pass-filtered line minimum and maximum values, and outputting the extracted minimum and maximum values as the field minimum and maximum values, respectively; and an adaptive black level stretch unit for calculating a tilt point which delimits a dark region that is stretched using the field minimum and maximum values, and stretching the black level of the image signal if the image signal level is lower than or equal to the tilt point.

According to another aspect of the first objective of the present invention, there is provided a method for stretching the black level of an input image signal, comprising the steps of: (a) receiving the image signal and extracting the minimum and maximum values of each field of the image signal to obtain field minimum and maximum values; (b) extracting a tilt point which delimits a dark region that is stretched using the field minimum and maximum values; (c) calculating a first gradient for stretching the field minimum value to a predetermined value, using the field minimum value and the tilt point; (d) selecting the first gradient or a second gradient defined by users, according to the dynamic range of the input signal; and (e) stretching the black level of the image signal using the selected gradient.

According to another aspect of the second objective of the present invention, there is provided a method for stretching the black level of an input image signal, comprising the steps of: (a) receiving the image signal and extracting the minimum value of each field of the image signal to obtain a field minimum value; (b) receiving the image signal and extracting the average value of the image signal levels of each field that belongs to a dark region to be stretched, and outputting the extracted average value as a dark region average value; (c) extracting a tilt point which delimits the dark region that is stretched using the field minimum value and the dark region average value; (d) calculating a pre-gradient for stretching the field minimum value to a predetermined value, using the field minimum value and the tilt point; (e) calculating a gradient by multiplying the pre-gradient by a predetermined gradient grain; and (f) stretching the black level of the image signal using the gradient.

According to another aspect of the second objective of the present invention, there is provided a method for stretching the black level of an input image signal, comprising the steps of: (a) receiving the image signal and extracting the minimum value of each field of the image signal to obtain a field minimum value; (b) receiving the image signal and extracting the average value of the image signal levels of each field that belongs to a dark region to be stretched, and outputting the extracted average value as a dark region average value; (c) extracting a tilt point which delimits the dark region that is stretched using the field minimum value and the dark region average value; (d) calculating a pre-gradient for stretching the field minimum value to a predetermined value, using the field minimum value and the tilt point; (e) calculating a gradient by multiplying the pre-gradient by a predetermined gradient grain; and (f) stretching the black level of the image signal using the gradient.

BRIEF DESCRIPTION OF THE DRAWINGS

The above objectives and advantages of the present invention will become more apparent by describing in detail preferred embodiments thereof with reference to the attached drawings in which.

DETAILED DESCRIPTION OF THE INVENTION

Figure 1:
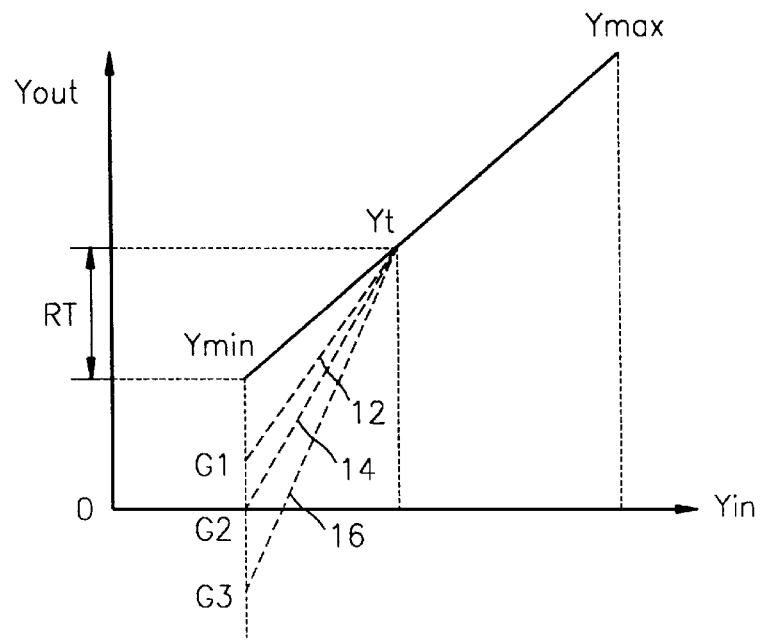
FIG. 1 illustrates a conventional black level stretching technique.
Figure 2:
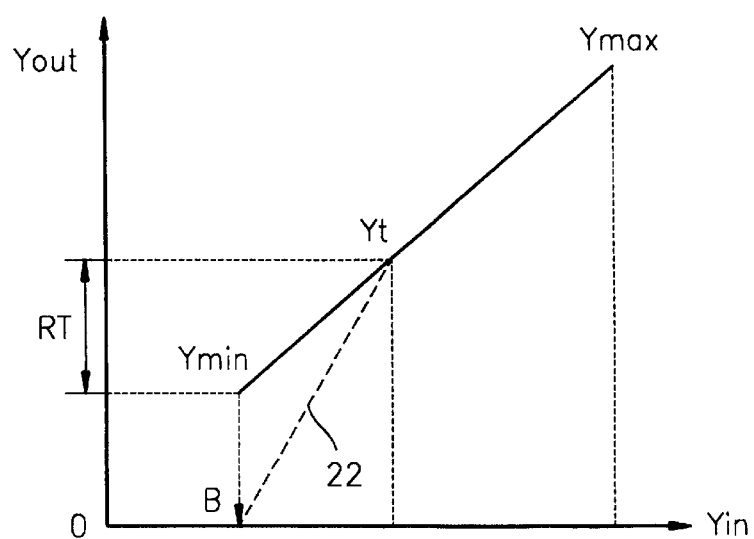
FIG. 2 illustrates another conventional black level stretching technique.
Figure 3:
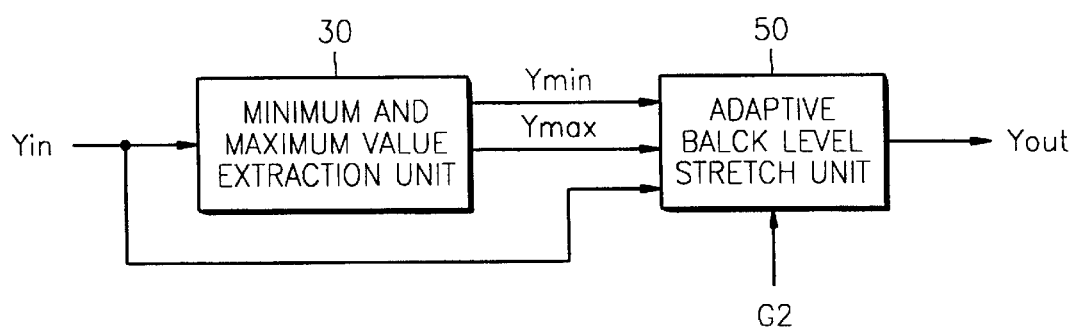
FIG. 3 is a block diagram of a preferred embodiment of an adaptive black level stretching apparatus according to the present invention.

A block diagram of an adaptive black level stretching apparatus according to a preferred embodiment of the present invention is shown in FIG. 3. As shown in FIG. 3, the adaptive black level stretching apparatus includes a minimum and maximum value extraction unit 30 and an adaptive black level stretch unit 50. The minimum and maximum value extraction unit 30 receives an image signal Yin, extracts the field minimum and maximum values Ymin and Ymax, i.e., the minimum and maximum values of each field of the image signal Yin, and outputs the field minimum and maximum values Ymin and Ymax.

The adaptive black level stretch unit 50 calculates a tilt point Yt, which delimits a dark region that is stretched, using the field minimum and maximum values Ymin and Ymax of each field. The adaptive black level stretch unit 50 also calculates a first gradient G1 for use in stretching the field minimum value Ymin to a predetermined value, using the tilt point Yt and the field minimum value Ymin. The predetermined value corresponds to the minimum level of the hardware range of an image signal processing system used, for example, zero. The adaptive black level stretch unit 50 selects the first gradient G1, or a second gradient G2, which is defined by users, according to the dynamic range of the input image signal Yin, and stretches the black level of the image signal Yin using a selected gradient.

The first gradient G1 is selected when the dynamic range of the image signal Yin is wide, and the second gradient G2 is selected when the dynamic range of the image signal Yin is narrow, for stretching the black level of the input signal Yin. That is, the inventive black level stretching apparatus is able to adaptively stretch the black level of the input image signal Yin according to the dynamic range of the image signal Yin.

Figure 4:
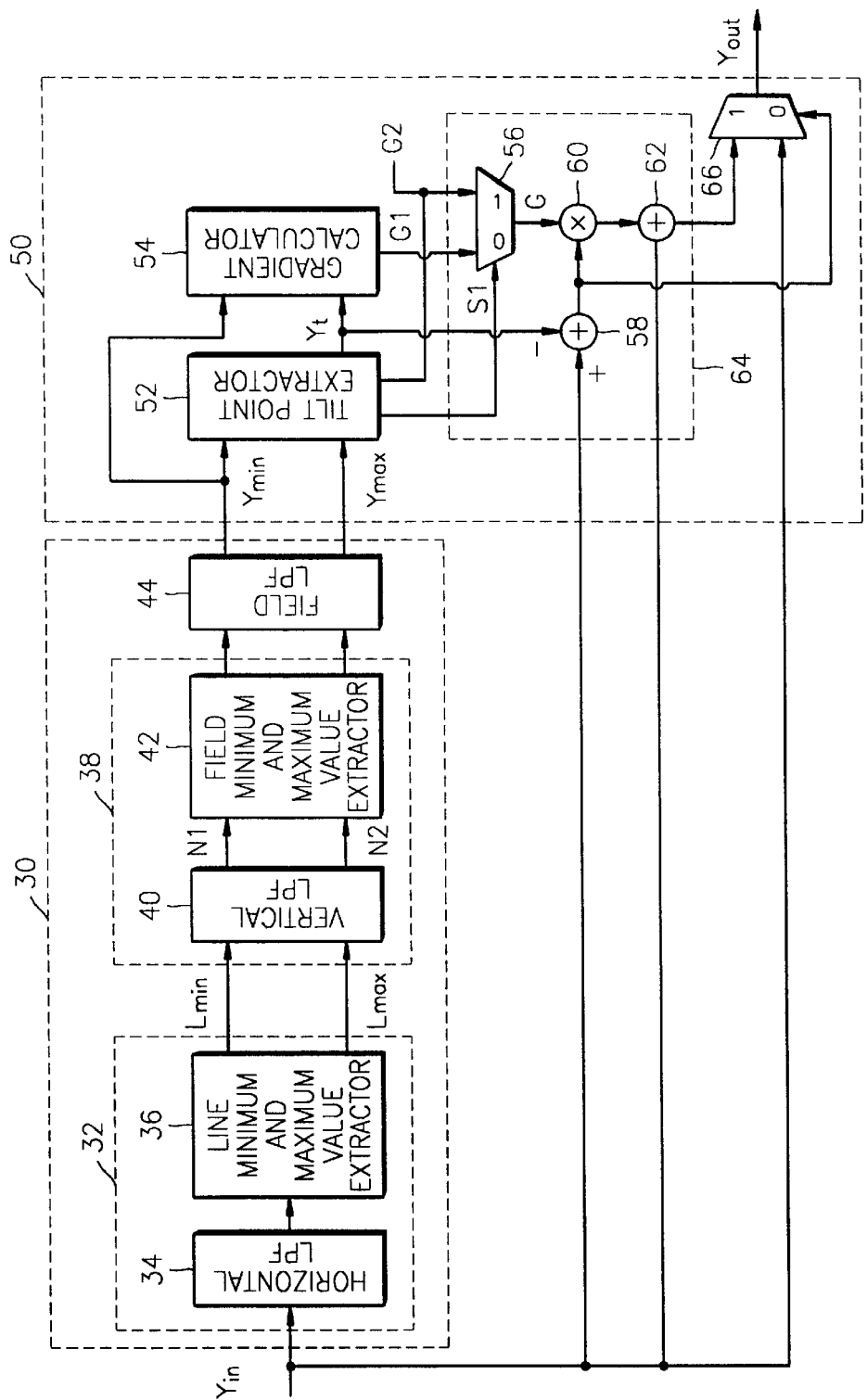
FIG. 4 is a detailed circuit diagram of the adaptive black level stretching apparatus of FIG. 3.

FIG. 4 is a detailed circuit diagram of the adaptive black level stretching apparatus of FIG. 3. Referring to FIG. 4, the minimum and maximum value extraction unit 30 includes a first low-pass filter (LPF) 32, a second LPF 38 and a field LPF 44. The adaptive black level stretch unit 50 includes a tilt point extractor 52, a gradient calculator 54, a black level stretch means 64 and an image signal output portion 66.

In particular, the first LPF 32 low-pass-filters the image signal Yin to remove impulse noise from each line, and extracts the line minimum and maximum values Lmin and Lmax, i.e., the minimum and maximum values of each line, from the noise-free signal. By doing so, a possible error that noise, for example, impulse noise, is extracted as the line minimum or maximum value Lmin or Lmax of a line can be prevented. The first LPF 32 includes a horizontal LPF 34 and a line minimum and maximum value extractor 36. The horizontal LPF 34 horizontally low-pass-filters the image signal Yin to remove impulse noise present in each line. The line minimum and maximum value extractor 36 extracts the line minimum and maximum values Lmin and Lmax, from the image signal output from the horizontal LPF 34, from which impulse noise has been removed, and outputs the extracted line minimum and maximum values Lmin and Lmax.

Figure 5:
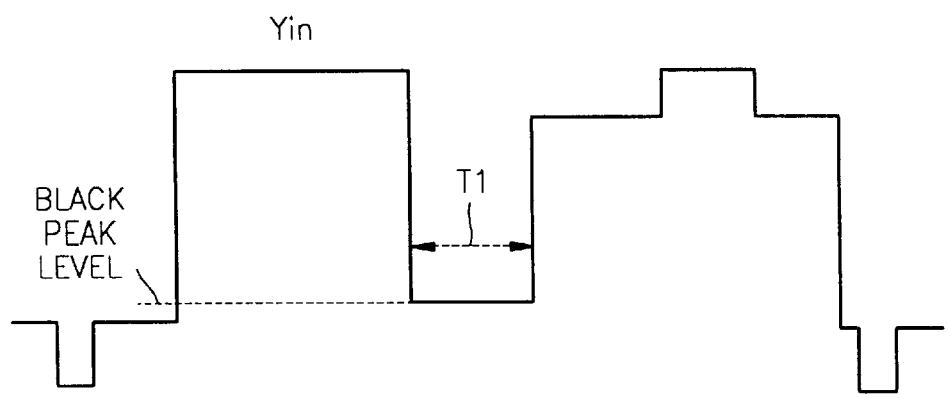
FIG. 5 illustrates the characteristics of the horizontal LPF of FIG. 4 with reference to an image signal.

FIG. 5 illustrates the characteristics of the horizontal LPF 34 on an input image signal Yin. Referring to FIG. 5, the image signal Yin for a line has a first interval T1 for which the level of the image signal Yin suddenly drops. The first interval T1 can be recognized as impulse noise or a normal signal depending on the filtering characteristics of the horizontal LPF 34. In other words, if the cut-off frequency of the horizontal LPF 34 is low, the first interval T1 is regarded as impulse noise. Meanwhile, if the cut-off frequency of the horizontal LPF 34 is high, the first interval T1 is regarded as the image signal Yin.

The relationship between the cut-off frequency of the horizontal LPF 34 and the first interval T1 is shown in Table 1. Table 1 illustrates the variations of the first interval T1, which can be recognized as a normal image signal, with respect to the cut-off frequency of the horizontal LPF 34.

TABLE 1

| No. | cut-off frequency [kHz] | first interval [s] |
|---|---|---|
| 1 | 570 | 1.5 |
| 2 | 420 | 2 |
| 3 | 280 | 3 |
| 4 | 200 | 4 |
| 5 | 130 | 5 |
| 6 | 100 | 6 |
| 7 | 70 | 13 |
| 8 | 50 | 17 |

As can be inferred from Table 1, the fist interval T1 needs to be increased for recognition as a normal image signal as the cut-off frequency becomes low.

Figure 6:
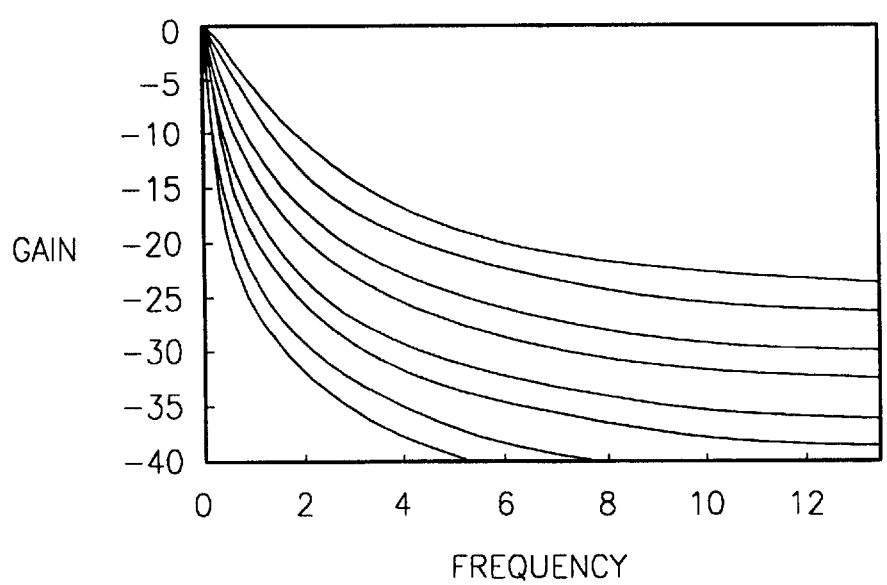
FIG. 6 illustrates the relationship between the gain and the cut-off frequency of the horizontal LPF 34 shown in FIG. 4.

FIG. 6 illustrates the relationship between the gain and the cut-off frequency of the horizontal LPF 34 shown in FIG. 4. As shown in FIG. 6, the gain of the horizontal LPF 34 can be adjusted according to the cut-off frequency.

The second LPF 38 low-pass-filters the line minimum and maximum values Lmin and Lmax output from the first LPF 32 to output the field minimum and maximum values Ymin and Ymax, respectively. For example, if caption data are displayed on the screen, a black or white level of the caption signals is continuously displayed on some lines of the screen. However, if any process is not performed on these black or white level signals, the black or white level of signals can be extracted as the field minimum or maximum value Ymin or Ymax. In order to prevent occurrence of this type of error, when continuous black or white level signals are displayed on particular lines of a screen, the second LPF 38 low-pass-filters the black or white level of signals of caption data, such that the field minimum and maximum values Ymin and Ymax can be accurately extracted in each field.

Figure 7:
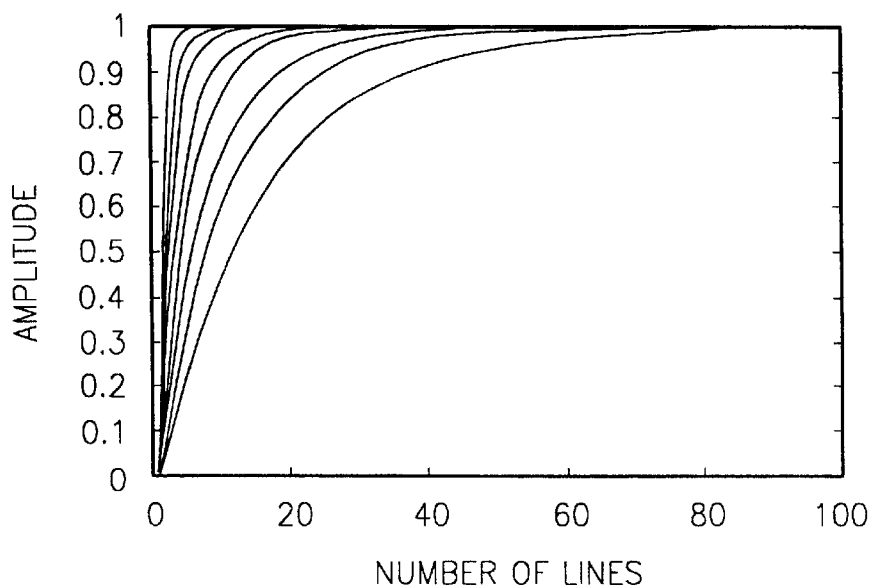
FIG. 7 illustrates the step response characteristics of the vertical LPF of FIG. 4.

In particular, the second LPF 38 includes a vertical LPF 40 and a field minimum and maximum value extractor 42. The vertical LPF 40 vertically low-pass-filters the line minimum and maximum values Lmin and Lmax output from the first LPF 32, and outputs a first signal N1 and a second signal N2, respectively. The field minimum and maximum value extractor 42 extracts the minimum value of the first signal N1 output from the vertical LPF 40 and outputs the field minimum value Ymin. The field minimum and maximum value extractor 42 extracts the maximum value of the second signal N2 and outputs the field maximum value Ymax. The step response characteristics of the vertical LPF 40 of FIG. 4 is shown in FIG. 7. As shown in FIG. 7, the vertical LPF 40 has a step response characteristic ranging between 4 and 90 lines.

Figure 8:
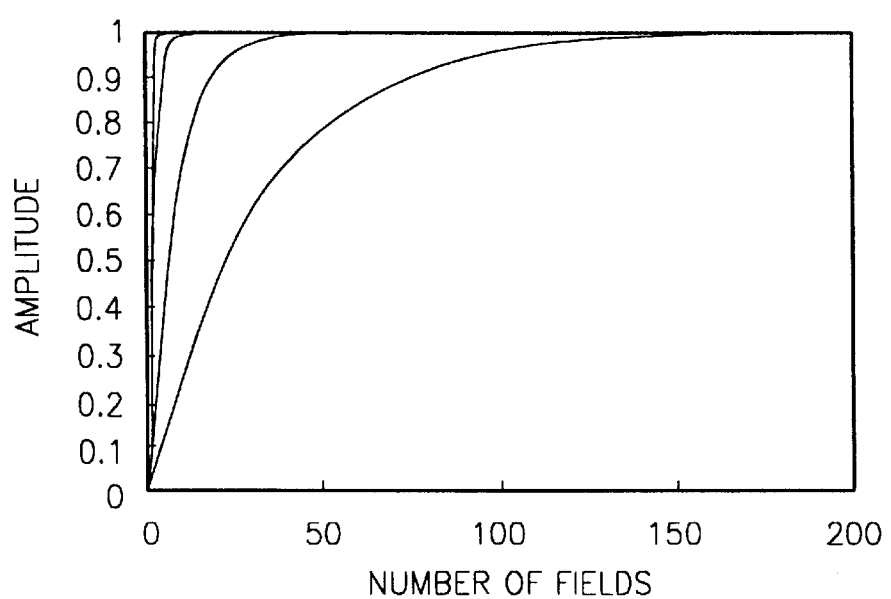
FIG. 8 illustrates the step response characteristics of the field LPF of FIG. 4.

On the other hand, the field LPF 44 low-pass-filters the field minimum and maximum values Ymin and Ymax output from the second LPF 38 to remove extreme field minimum and maximum values Ymin and Ymax among the values output from the second LPF 38. The step response characteristics of the field LPF 44 of FIG. 4 is shown in FIG. 8. As shown in FIG. 8, the field LPF 44 has a step response characteristic ranging between 3 and 180 fields.

On the other hand, in the adaptive black level stretch unit 50, the tilt point extractor 52 extracts a tilt point Yt, which delimits a dark region that is stretched, using the field minimum and maximum values Ymin and Ymax output from the field LPF 44. The tilt point Yt can be varied by users. For example, an intermediate value between the field minimum and maximum values Ymin and Ymax can be defined as the tilt point Yt. Alternatively, an one-third point or two-third point between the field minimum and maximum values Ymin and Ymax of each field can be defined as the tilt point Yt. The tilt point extractor 52 also stretches the field minimum value Ymin using the second gradient G2 defined by users, which is expressed by formula (5), and compares the result of the stretching with a predetermined value (the minimum level of the hardware range), i.e., zero, and outputs a first select signal S1:

$$Yout = Ymin + G2*(Y\min - Yt). \quad (5)$$

The gradient calculator 54 receives the field minimum value and the tilt point Yt and calculates a first gradient G1 using formula (6), which is utilized to stretch the field minimum value Ymin to a predetermined value:

$$G1 = \frac{Yt}{Yt - Y\min} - 1. \quad (6)$$

The black level stretch means 64 selects the first gradient G1 or the second gradient G2 according to the first select signal S1, and stretches the black level of the image signal using a selected gradient G and the tilt point Yt. In particular, when the result of the calculation using formula (5) is greater than zero, the tilt point extractor 52 determines that the dynamic range of the image signal Yin is narrow, and outputs a first select signal S1, which enables the black level stretch means 64 to select the second gradient G2 and stretch the black level of the image signal Yin using the second gradient G2. In contrast, when the result of the calculation using formula (5) is less than zero, the tilt point extractor 52 determines that the dynamic range of the image signal Yin is wide, and outputs a select signal S1, which enables the black level stretch means 64 to select the first gradient G1 and stretch the black level of the image signal Yin using the first gradient G1.

In particular, the black level stretch means 64 includes a selector 56, a subtractor 58, a multiplier 60 and an adder 62. The selector 56 receives the first gradient G1 and the second gradient G2, and selectively outputs the first gradient G1 or the second gradient G2 according to the select signal S1. The subtractor 58 subtracts the tilt point Yt from the image signal Yin. The multiplier 60 multiplies the subtraction result (Yin Yt) from the subtractor 58 by a gradient G selected by the selector 56. The adder 62 sums the image signal Yin and the product ((Yin Yt)*G) from the multiplier 60, and outputs the summation result, which is the image signal whose black level has been stretched.

The black level stretched image signal output from the adder 62 is expressed by formula (4) above when the first gradient G1 is selected according to the select signal S1, and by formula (2) above when the second gradient G2 is selected according to the select signal S1. In other words, the black level of the image signal is stretched using formula (4) above when an image signal Yin having a wide dynamic range is input, and using formula (2) above when an image signal Yin having a narrow dynamic range is input. The inventive black level stretch apparatus adaptively stretches the black level of an image signal according to the dynamic range of the image signal Yin, and thus optimum black level stretching is ensured by solving the problems of the both conventional techniques described previously, which stretch the black level of an image signal using formulae (2) and (4), respectively.

The image signal output portion 66 receives the black level stretched image signal output from the black level stretch means 64, and the original input image signal Yin, and selectively outputs the black level stretched image signal or the original image signal Yin as an output image signal Yout, according to the subtraction result from the subtractor 58. In particular, if the subtraction result from the subtractor 58 is a positive value, the image signal output portion 66 outputs the original image signal Yin as the output image signal Yout. The positive subtraction result means that the level of the input image signal Yin is higher than the tilt point Yt, and thus black level stretching is unnecessary, so that the original image signal Yin is output without need for black level stretching. In contrast, when the subtraction result from the subtractor 58 is a negative value, the image signal output portion 68 outputs the black level stretched image signal as the output image signal Yout. The negative subtraction result means that the level of the image signal Yin is lower than the tilt point Yt, and thus the black level stretched image signal Yout is output.

Figure 9:
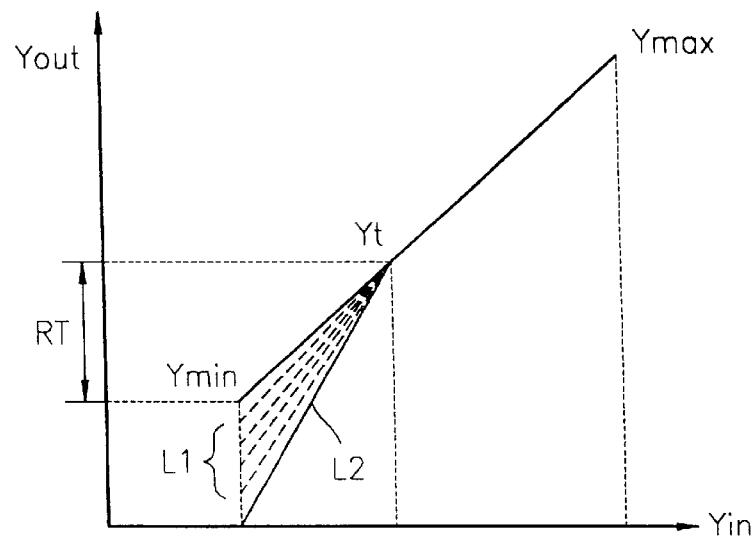
FIG. 9 illustrates the black level stretching of an image signal by the adaptive black stretching apparatus of FIG. 4.

FIG. 9 graphically illustrates the black level stretching of the image signal Yin by the adaptive black level stretching apparatus shown in FIG. 4. Referring to FIG. 9, dashed lines L1 represent the results of black level stretching of the image signal Yin using the gradient G2, and solid line L2 represents the result of black level stretching of the image signal Yin using the gradient G1.

As previously described, the preferred embodiment of the adaptive black level stretching apparatus shown in FIG. 4 adaptively stretches the black level of an input image signal according to the dynamic range of the input image signal, so that overstretching beyond the hardware range can be prevented. In addition, a sudden change in image levels due to the presence of impulse noise or caption data can be reduced by multi-stage low-pass-filtering, thereby minimizing flickers. However, the inventive adaptive black level stretching apparatus described with reference to FIG. 4 is insufficient to eliminate flickering which occurs between a field with much caption data and a field without caption data, because it uses the field minimum and maximum values for the black level stretching. Another black level stretching apparatus capable of accounting for this problem is shown in FIG. 10.

Figure 10:
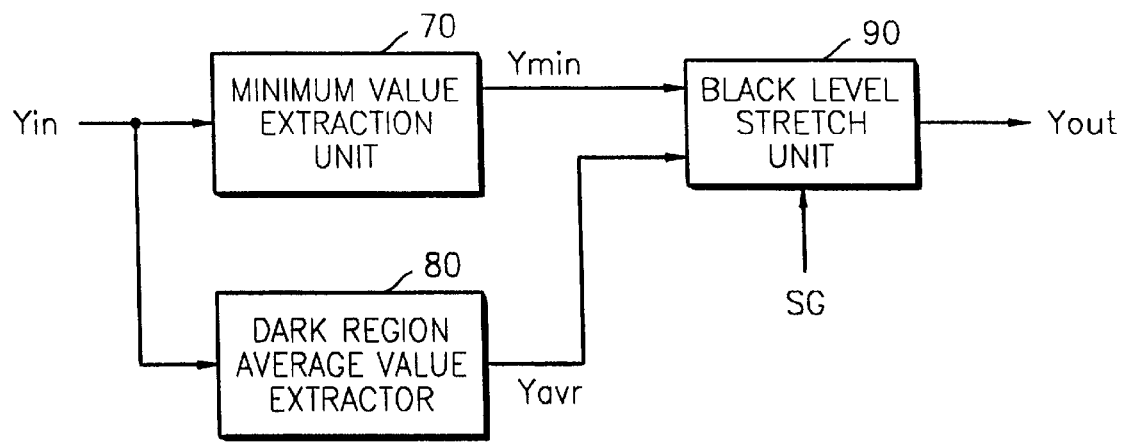
FIG. 10 is a block diagram of another preferred embodiment of a black level stretching apparatus according to the present invention.

Referring to FIG. 10, another black level stretching apparatus according to the present invention includes a minimum value extraction unit 70, a dark region average value extractor 80 and a black level stretch unit 90. In particular, the minimum value extractor 70 receives an input image signal Yin, and extracts the minimum value of a field of the image signal Yin, and outputs the field minimum value Ymin. The dark region average value extractor 80 extracts the average value of the levels of the image signal Yin of each field, which belong to the dark region, and output the dark region average value Vavr. In the dark region, the levels of the image signal Yin are lower than a dark region boundary point (see FIG. 12). The dark region boundary point can be determined by users.

Figure 12:
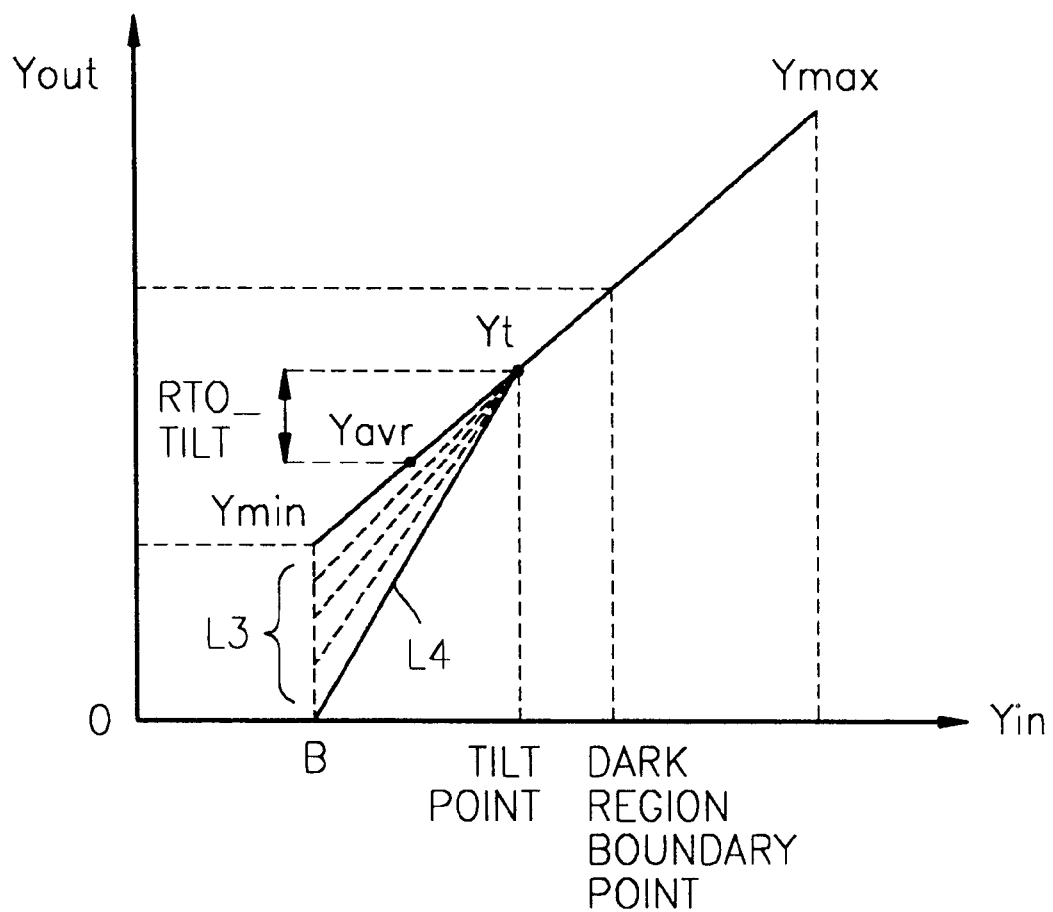
FIG. 12 illustrates the black level stretching of an image signal by the black level stretching apparatus of FIG. 11.

The black level stretch unit 90 calculates a tilt point Yt, which determines a dark region that is stretched, using the field minimum value Ymin and the dark region average value Yavr. The black level stretch unit 90 also calculates a pre-gradient S1 for use in stretching the field minimum value Ymin to a predetermined value, using the tilt point Y1 and the field minimum value Ymin. The predetermined value corresponds to the minimum level of the hardware range of an image signal processing system used, for example, zero. Referring to FIG. 12, the pre-gradient S1 corresponds to the gradient of line L4 between the tilt point Y1 and point B, when the field minimum value Ymin is stretched to the minimum value of the hardware range, i.e., to zero. The black level stretch unit 90 calculates a gradient S2 for use in black level stretching by multiplying the pre-gradient S1 by a predetermined gradient gain SG defined by users, and stretches the black level of the image signal Yin using the gradient S2.

Figure 11:
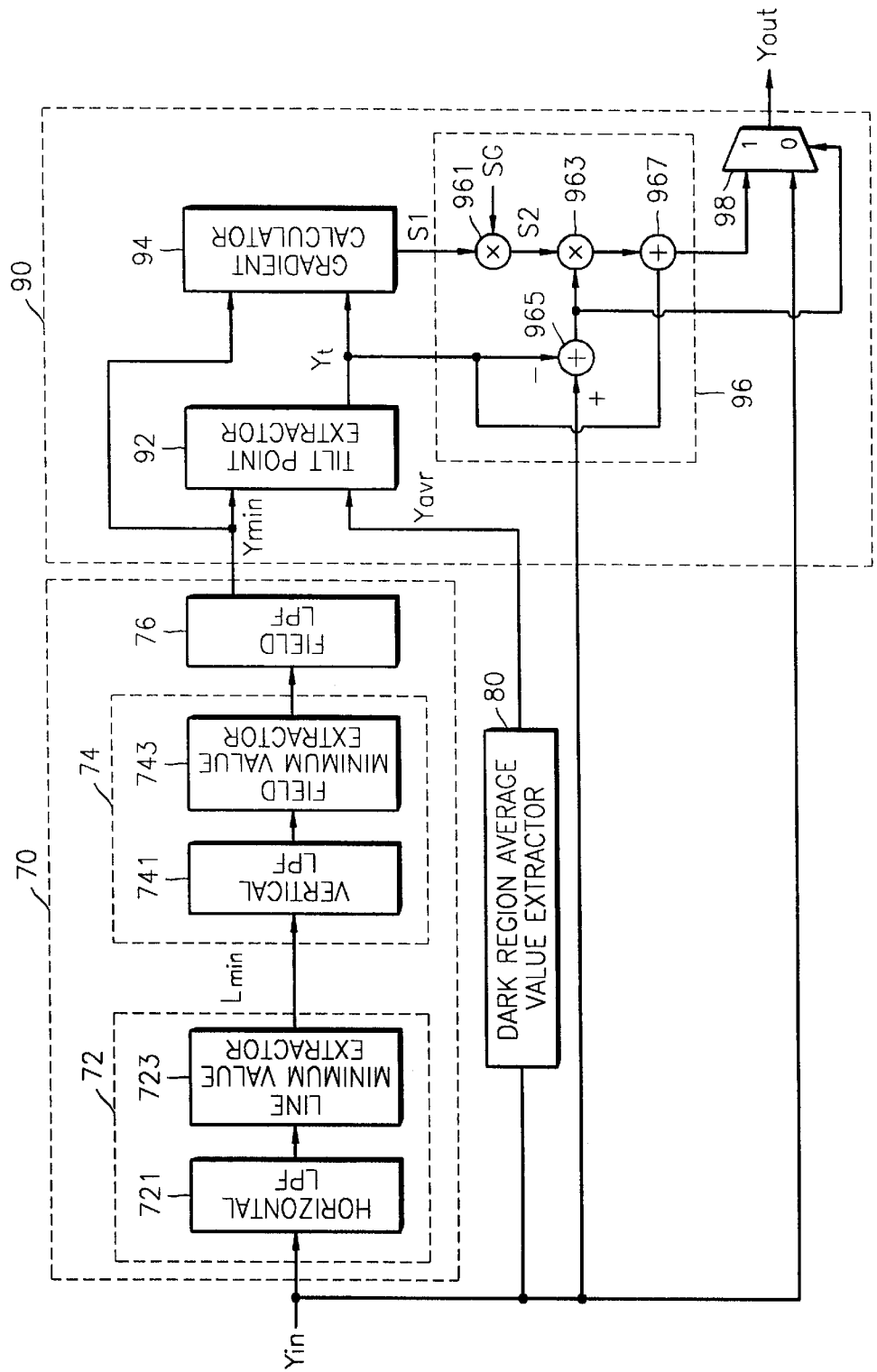
FIG. 11 is a detailed circuit diagram of the black level stretching apparatus of FIG. 10.

FIG. 11 is a detailed circuit diagram of the black level stretching apparatus of FIG. 10. Referring to FIG. 11, the minimum value extraction unit 70 includes a first LPF 72, a second LPF 74 and a field LPF 76. The black level stretch unit 90 includes a tilt point extractor 92, a gradient calculator 94, a black level stretch means 96 and an image signal output portion 98.

In particular, the first LPF 72 low-pass-filters the image signal Yin to remove impulse nose from each line, and extracts the line minimum value Lmin to each line from the noise-free signal. The first LPF 72 includes a horizontal LPF 721 and a line minimum value extractor 723. The horizontal LPF 721 horizontally low-pass-filters the image signal Yin to remove impulse noise present in lines. The line minimum value extractor 723 extracts the line minimum value Lmin from the image signal output from the horizontal LPF 721, from which impulse noise has been removed, and outputs the extracted line minimum value Lmin. Like the horizontal LPF 34 shown in FIG. 4, the gain of the horizontal LPF 721 can be adjusted according to the cut-off frequency.

The second LPF 74 low-pass-filters the line minimum value Lmin output from the first LPF 72 to output the field minimum value Ymin of each field. The second LPF 74 includes a vertical LPF 741 and a field minimum value extractor 743. The vertical LPF 741 vertically low-pass-filters the line minimum value Lmin output from the first LPF 72, and outputs the low-pass-filtered signal. The field minimum value extractor 743 extracts the minimum value of the signal output from the vertical LPF 741 and outputs the field minimum value Ymin. The field LPF 76 low-pass-filters the filtered minimum value Ymin output from the second LPF 74 to remove extreme field minimum value Ymin among the values output from the second LPF 74. Like the vertical LPF 40 of FIG. 4, the vertical LPF 741 has a step response characteristic ranging between 4 and 90 lines. Like the field LPF 44 of FIG. 4, the field LPF 76 has a step response characteristic ranging between 3 and 180 field.

On the other hand, although the dark region average value extractor 80 is not described in greater detail in FIG. 11, the dark region average value extractor 80 may adopt a simple structure including an adder and a divider. The dark region average value Yavr can be obtained by dividing the sum of the image signals, which belong to the dark region of a field, by the number of the image signals present in the dark region of the corresponding field.

In the black level stretch unit 90, the tilt point extractor 92 extracts a tilt point Yt, which delimits a dark region that is stretched, using the field minimum value Ymin and the dark region average value Yavr. The tilt point Yt can be extracted using formula (7):

$$Yt = Y\min + RTO\_TILT * (Yavr - Y\min). \quad (7)$$

In formula (7), RTO_TILT represents a ratio of the tilt point Yt to the dark region average value Yavr and the field minimum value Ymin, as shown in FIG. 12, which is determined by users and is a significant factor affecting the tilt point Yt along with the dark region average value Yvar and the field minimum value Ymin.

The gradient calculator 94 receives the field minimum value and the tilt point Yt and calculates a pre-gradient S1 using formula (8), which corresponds to the gradient of line L4 between the tilt point Yt and point B, as shown in FIG. 12, when the field maximum value Ymin is stretched to a predetermined value, i.e., to zero:

$$S1 = \frac{Yt}{Yt - Y\min} \quad (8)$$

The black level stretch means 96 calculates the gradient S, which determines the degree of stretching of the image signal Yin, by multiplying the pre-gradient S1 by a predetermined gradient gain SG, and stretches the black level of the image signal Yin using the gradient S2 and the tilt point Yt, as expressed by formula (9):

$$Yout = S2 * (Yin - Yt) + Yt = SG * \frac{Yt}{Yt - Y\min} * (Yin - Yt) + Yt \quad (9)$$

where SG is a value of 0–1, which represents a gradient gain defined by users. For example, if the gradient gain SG is 1, the gradient S2 is equal to the pre-gradient S1, so that the field minimum level Ymin is stretched to a predetermined value, i.e., zero. The smaller the gradient gain SG, the less the degree of black level stretching. It is preferable that the gradient gain SG is defined such that the gradient S2 is greater than the gradient between the tilt point Yt and the field minimum value Ymin, as shown in FIG. 12, and less than and equal to the pre-gradient S1.

In particular, the black level stretch means 96 includes a first multiplier 961, a second multiplier 963, a subtractor 965 and an adder 967. The first multiplier 961 multiplies the pre-gradient S1 by the gradient gain SG and outputs the product as the gradient S2. The subtractor 965 subtracts the tilt point Yt from the image signal Yin. The second multiplier 963 multiplies the subtraction result (Yin Yt) from the subtractor 965 by the gradient S2. The adder 967 sums the image signal Yin and the product ((Yin Yt)*S2) from the second multiplier 963, and outputs the summation result, which is the image signal whose black level has been stretched.

The image signal output portion 98 receives the black level stretched image signal output from the black level stretch means 96, and the original input image signal Yin, and selectively outputs the black level stretched image signal or the original image signal Yin as an output image signal Yout, according to the subtraction result from the subtractor 965. In particular, if the subtractor result from the subtractor 965 is a positive value, the image signal output portion 98 outputs the original image signal Yin as the output image signal. The positive subtraction result means that the level of the input image signal Yin is higher than the tilt point Yt, and thus black level stretching is unnecessary, so that the original image signal Yin without need for black level stretching. In contrast, when the subtraction result from the subtractor 965 is a negative value, the image signal output portion 98 outputs the black level stretched image signal as the output image signal Yout. The negative subtraction result means that the level of the image signal in is lower than the tilt point Yt, and thus the black level stretched image signal is output.

FIG. 12 graphically illustrates the black level stretching of the image signal Yin by the black level stretching apparatus shown in FIG. 11. Referring to FIG. 12, dashed lines L3 represent the results of black level stretching of the image signal Yin with a gradient gain SG less than 1, and a solid line L4 represents the result of black level stretching of the image signal Yin with the gradient gain SG equal to 1. As the gradient gain SG becomes close to 1, the black level of the image signal Yin is stretched toward the solid line L4. Because the gradient gain SG is maximum at 1, no overstretching of the image signal Yin beyond the minimum value, i.e., zero, of the hardware range of the image processing system used occurs.

Image distortion caused by overstretching, which was a problem of a conventional black level stretching technique, can be reduced by the black level stretching apparatus shown in FIG. 10. In addition, use of the dark region average value, instead of the field maximum value, in stretching the black level of an image signal contributes to minimizing flicker, which possibly occurs when the image signal level suddenly changes, for example, between a field with much caption data and a field without caption data. In particular, the black level stretching apparatus of FIG. 10 is more effective in eliminating flicker caused by the white caption data. Furthermore, the degree of black level stretching can be adjusted by users by varying the gradient gain for the black level stretching.

Figure 13:
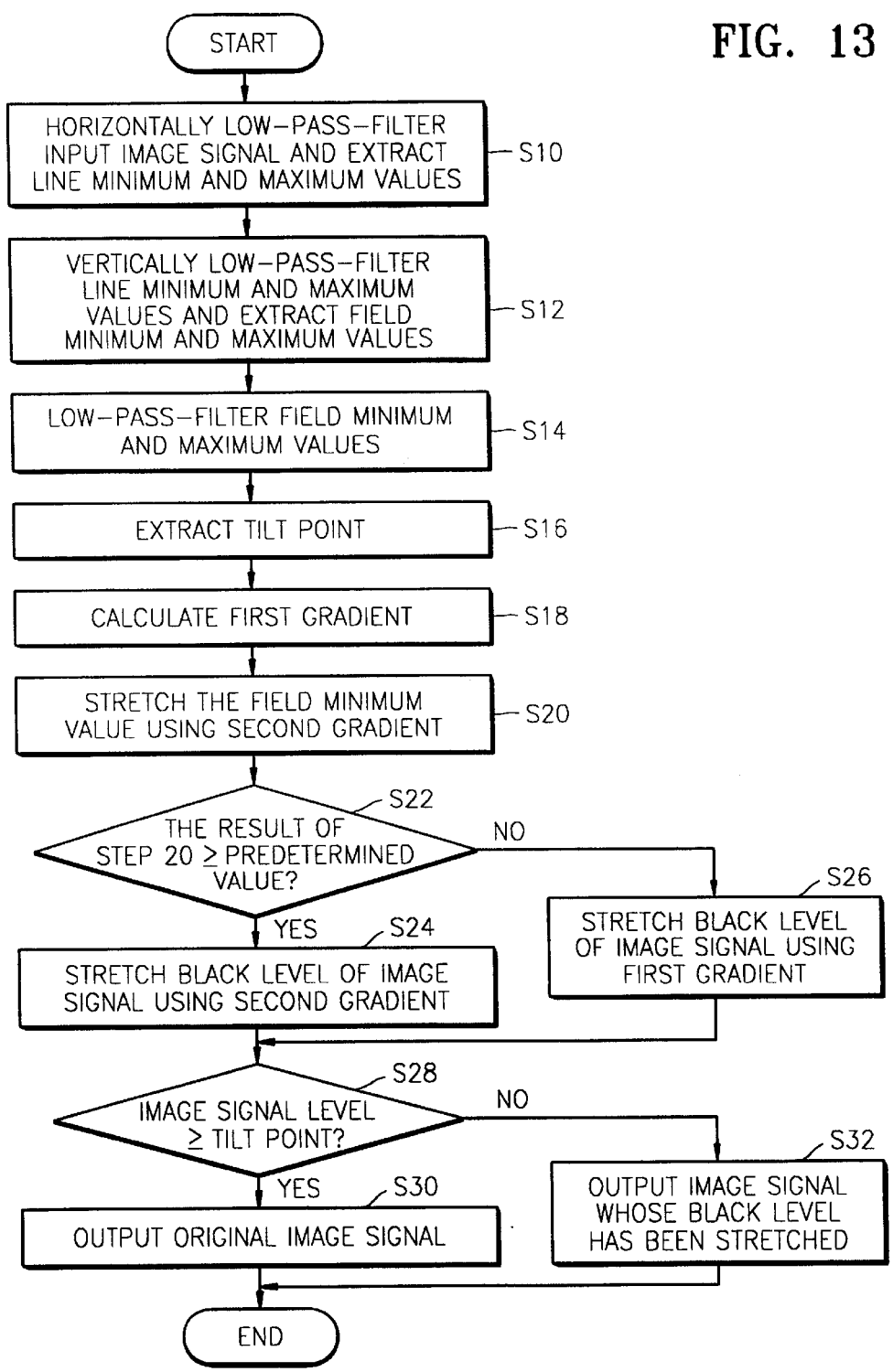
FIG. 13 is a flowchart illustrating a black level stretching method used by the adaptive black level stretching apparatus of FIG. 4.

FIG. 13 is a flowchart illustrating a black level stretching method used by the adaptive black level stretching apparatus shown in FIG. 4. The black level stretching method will be briefly described with reference to FIG. 13. First, and input image signal Yin is horizontally low-pass-filtered and line minimum and maximum values Lmin and Lmax of each line are extracted (step S10). Next, the line minimum and maximum values Lmin and Lmax are vertically low-pass-filtered, and field minimum and maximum values Ymin and Ymax of each field are extracted (step S12). The field minimum and maximum values Ymin and Ymax extracted in step S12 are low-pass-filtered (step S14).

Following this, in step S12, a tilt point Yt is extracted using formula (1) above, with the field minimum and maximum values Ymin and Ymax (step S16). A first gradient G1 for stretching the field minimum value Ymin to the minimum value of the hardware range of an image processing system used is calculated using formula (6) above (step S18). The field minimum value Ymin is also stretched using a second gradient G2 defined by users (Step S20).

In step S22, it is determined whether the result of the black level stretching from step S20 is greater than or equal to a predetermined value, i.e., zero. If the result of step S20 is greater than or equal to the predetermined value, the black level of the image signal Yin is stretched using formula (2) above, with the second gradient G2 (step S24). Otherwise, the black level of the image signal Yin is stretched using formula (4), with the first gradient G1 calculated in step S18 (step S26). In step S28, it is determined whether the level of the image signal Yin is greater than or equal to the tilt point Yt. If yes, the original image signal Yin, which has not undergone the black level stretching, is output (Step S30). Otherwise, the image signal whose black level has been stretched using formula (2) or (4) above is output (step S32).

Figure 14:
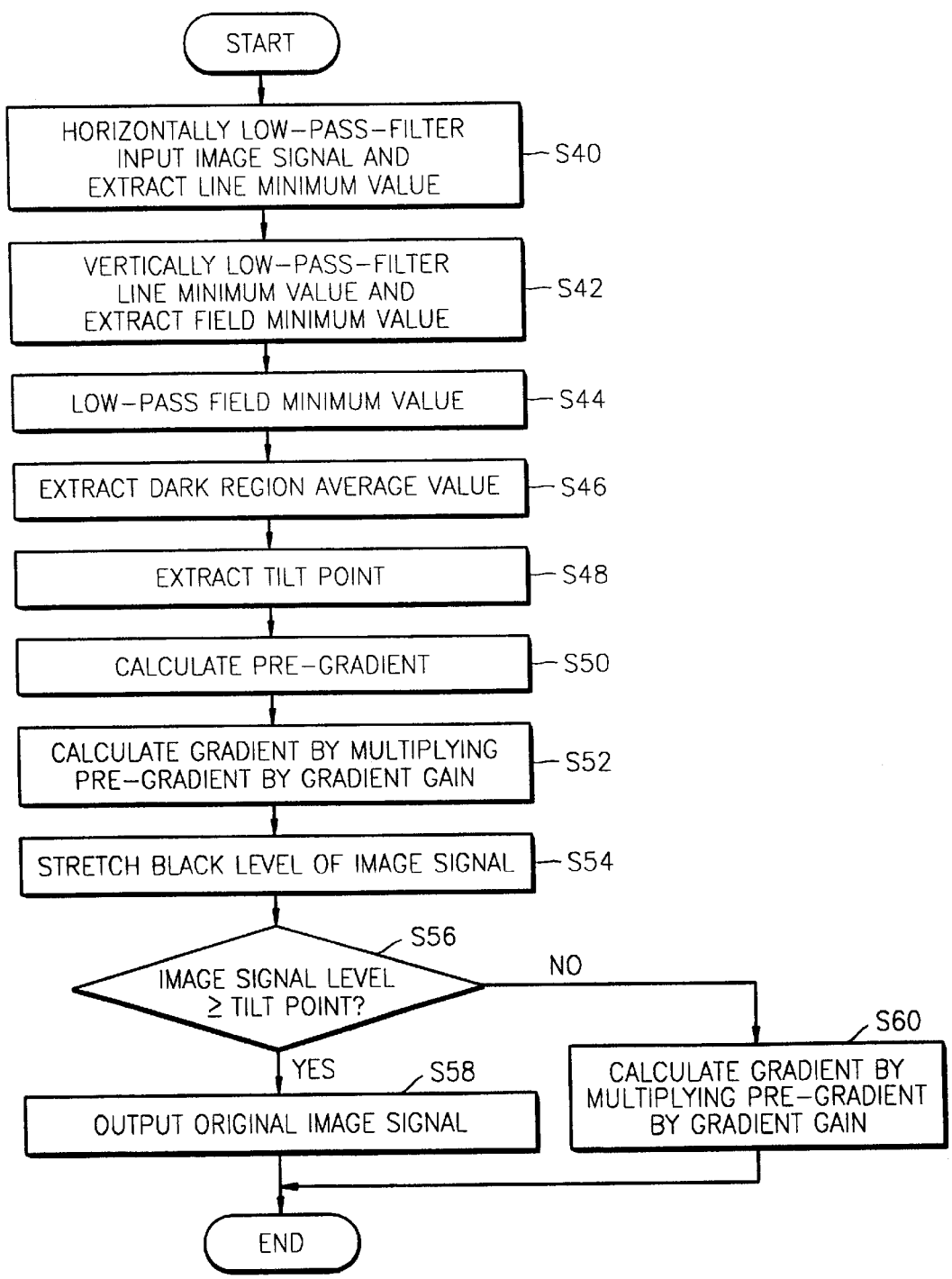
FIG. 14 is a flowchart illustrating a black level stretching method used by the black level stretching apparatus of FIG. 11.

FIG. 14 is a flowchart illustrating a black level stretching method used by the black level stretching apparatus shown in FIG. 11. The black level stretching method will be briefly described with reference to FIG. 14. First, an input image signal Yin is horizontally low-pass-filtered and the line minimum Lmin of each line is extracted (step S40). Next, the line minimum value Lmin is vertically low-pass-filtered, and the field minimum value Ymin of each field is extracted (step S42). The field minimum value Ymin extracted in step S41 is low-pass-filtered (step S44). The average value Yavr or the image signal levels of each field, which belong to the dark region of a screen, is extracted (step S46).

Following this, in step S48, a tilt point Yt is extracted using formula (7) above, with the field minimum value Ymin and the dark region average value Yavr (step S48). A pre-gradient S1 is calculated using formula (8) above (step S50). A gradient S2 is calculated by multiplying the pre-gradient S1 by a gradient gain SG defined by users (step S52).

Next, in step S54, the black level of the image signal Yin is stretched using formula (9), with the gradient S1 calculated in step S52. In step S56, it is determined whether the level of the image signal Yin is greater than or equal to the tilt point Yt. If yes, the original image signal Yin, which has not undergone the black level stretching, is output (step S58). Otherwise, the image signal whose black level has been stretched using formula (9) above is output (step S60).

As previously mentioned, the black level stretching apparatus according to the present invention prevents overstretching, and minimizes flicker caused by a sudden change in signal levels due to the presence of impulse noise or caption data, by low-pass-filtering the input image signal through multiple stages. In particular, the adaptive black level stretching apparatus described with reference to FIG. 4 adaptively stretches the black level of an image signal according to the dynamic range of the image signal, so that failure caused by large field-to-field level difference can be prevented. The black level stretching apparatus described with reference to FIG. 11 allows users to adjust the degree of the stretching. In addition, use of the dark region average value, rather than the field maximum value. In stretching the dark region of the image signal is much effective in eliminating flicker in a field containing caption data, and particularly, containing white caption data.

While the invention has been particularly shown and described with reference to preferred embodiments thereof, it will be understood by those skilled in the art that various changes in form and details may be made thereto without departing from the spirit and scope of the invention as defined by the appended claims.

What is claimed is:

1. An adaptive black level stretching apparatus comprising:
   a minimum and maximum value extraction unit for receiving an image signal, extracting the minimum and maximum values of each field of a plurality of fields of the image signal, and outputting the extracted minimum and maximum values as field minimum and maximum values, respectively; and
   an adaptive black level stretch unit for (i) calculating a tilt point which delimits a dark region that is stretched using the field minimum and maximum values, (ii) calculating a first gradient for use in stretching the field minimum value to a predetermined value using the field minimum value and the tilt point, (iii) selecting one of the first gradient and a second gradient defined by users according to the dynamic range of the image signal, and (iv) stretching the black level of the image signal using the selected gradient.

2. The adaptive black level stretching apparatus of claim 1, wherein the adaptive black level stretch unit comprises:

a tilt point extractor for extracting and outputting the tilt point, comparing the result of the black level stretching of the field minimum value using the second gradient with the predetermined value, and outputting the comparison result as a select signal;

a gradient calculator for receiving the field minimum value and the tilt point, calculating the first gradient for stretching the field minimum value to the predetermined value, and outputting the first gradient;

a black level stretch means for selecting one of the first gradient and the second gradient according to the select signal, and stretching the black level of the image signal using the selected gradient and the tilt point; and an image signal output portion for receiving the image signal, the tilt point and the black level stretched signal output from the black level stretch means, and outputting the original image signal if the image signal level is higher than the tilt point, and outputting the black level stretched signal if the image signal level is lower than the tilt point.

3. The adaptive black level stretching apparatus of claim 2, wherein the black level stretch means comprises:

a selector for receiving the first gradient and the second gradient, and selectively outputting one of the first gradient and the second gradient according to the select signal;

a subtractor for subtracting the tilt point from the image signal level;

a multiplier for multiplying the subtraction result from the subtractor by the gradient selected by the selector; and an adder for summing the image signal and the product from the multiplier, and outputting the summation result as the black level stretched image signal.

4. An adaptive black level stretching apparatus comprising:

a first low-pass filter unit for low-pass-filtering an image signal to remove impulse noise present in lines, and extracting line minimum and maximum values of each line from the low-pass-filtered image signal;

a second low-pass-filter unit for low-pass-filtering the line minimum and maximum values, extracting the minimum and maximum values from the low-pass-filtered line minimum and maximum values, and outputting the extracted minimum and maximum values as the field minimum and maximum values, respectively; and an adaptive black level stretch unit for calculating a tilt point which delimits a dark region that is stretched using the field minimum and maximum values, and stretching the black level of the image signal if the image signal level is lower than or equal to the tilt point.

5. The adaptive black level stretching apparatus of claim 4, further comprising a field low-pass filter connected between the second low-pass filter unit and the adaptive black level stretch unit, for low-pass-filtering extreme field minimum and maximum values between fields.

6. The adaptive black level stretch apparatus of claim 4, wherein the first low-pass filter unit comprises:

a horizontal low-pass filter for horizontally low-pass-filtering the image signal and outputting the horizontally low-pass-filtered image signal; and a line maximum and maximum value extractor for extracting the minimum and maximum values output from the horizontal low-pass filter, and outputting the extracted minimum and maximum values as the line minimum and maximum values, respectively.

7. The adaptive black level stretch apparatus of claim 4, wherein the second low-pass filter unit comprises:

a vertical low-pass filter for vertically low-pass-filtering the line minimum and maximum values, and outputting the vertically low-pass-filtered line minimum and maximum values as first and second signals, respectively; and a field minimum and maximum value extractor for extracting the minimum value of the first signal and the maximum value of the second signal and outputting the minimum and maximum values as the field minimum and maximum values, respectively.

8. The adaptive black level stretch apparatus of claim 4, wherein the adaptive black level stretch unit comprises:

a tilt point extractor for extracting and outputting the tilt point, comparing the result of the black level stretching of the field minimum value using a predetermined first gradient with a predetermined value, and outputting the comparison result as a first select signal;

a gradient calculator for receiving the field minimum value and the tilt point, calculating a second gradient for stretching the field minimum value to the predetermined value, and outputting the second gradient;

a black level stretch means for selecting one of the first gradient and the second gradient according to the select signal, and stretching the black level of the image signal using the selected gradient and the tilt point; and an image signal output portion for receiving the image signal, the tilt point and the black level stretched signal output from the black level stretch means, and outputting the original image signal if the image signal level is higher than the tilt point, and outputting the black level stretched signal if the image signal level is lower than the tilt point.

9. A black level stretching apparatus comprising:

a minimum value extraction unit for receiving an image signal, extracting the minimum value of each field of a plurality of fields of the image signal, and outputting the extracted minimum value as a field minimum value;

a dark region average value extractor for receiving the image signal, extracting the average value of the image signal levels of each field which belong to a dark region of the field, and outputting the extracted dark region average value; and a black level stretch unit for (i) calculating a tilt point which delimits the dark region that is stretched using the field minimum value and the tilt point, (ii) calculating a pre-gradient for use in stretching the field minimum value to a predetermined value using the field minimum.

10. The black level stretching apparatus of claim 9, wherein the black level stretch unit comprises:

a tilt point extractor for extracting and outputting the tilt point, using the field minimum value, the dark region average value and a predetermined ratio of the tilt point relative to the field minimum value and the dark region average value;

a gradient calculator for receiving the field minimum value and the tilt point, calculating the pre-gradient and outputting the calculated pre-gradient;

a black level stretch means for calculating the gradient using the pre-gradient and the gradient gain and stretching the black level of the image signal using the gradient; and an image signal output portion for receiving the image signal, the tilt point and the black level stretched signal output from the black level stretch means, and outputting the original image signal if the image signal level is higher than the tilt point, and the black level stretched signal if the image signal level is lower than the tilt point.

11. The black level stretching apparatus of claim 9, wherein the minimum value extraction unit comprises:

a first low-pass filter for removing impulse noise present in lines from the image signal, and extracting the line minimum value of each line from the impulse-noise-free image signal; and a second low-pass filter for low-pass-filtering the line minimum value, extracting the minimum value of the low-pass-filtered line minimum value, and outputting the extracted minimum value as the field minimum value.

12. The black level stretching apparatus of claim 11, further comprising a field low-pass filter connected between the second low-pass filter and the black level stretch unit, for low-pass-filtering the extreme field minimum value between fields.

13. A method for stretching the black level of an input image signal, comprising the steps of:

(a) receiving the image signal and extracting minimum and maximum values of each field of a plurality of fields of the image signal to obtain field minimum and maximum values;

(b) extracting a tilt point which delimits a dark region that is stretched using the field minimum and maximum values;

(c) calculating a first gradient for stretching the field minimum value to a predetermined value, using the field minimum value and the tilt point;

(d) selecting one of the first gradient and a second gradient defined by users, according to the dynamic range of the input signal; and (e) stretching the black level of the image signal using the selected gradient.

14. The method of claim 13, wherein step (a) comprises:

removing impulse noise present in lines of the screen from the image signal, and extracting the line minimum and maximum values of each line from the impulse-noise-free image signal;

low-pass-filtering the line minimum value, extracting the minimum value of the low-pass-filtered line minimum value, and outputting the extracted minimum value as the field minimum value; and low-pass-filtering the line maximum value, extracting the maximum value of the low-pass-filtered line maximum value, and outputting the extracted maximum value as the field maximum value.

15. The method of claim 13, wherein step (a) comprises:

determining whether the image signal level is higher than or equal to the tilt point;

outputting the original image signal if it is determined that the image signal level is higher than or equal to the tilt point; and outputting the image signal whose black level has been stretched if it is determined that the image signal level is lower than the tilt point.

16. A method for stretching the black level of an input image signal, comprising the steps of:

(a) receiving the image signal and extracting minimum value of each field of a plurality of fields of the image signal to obtain a field minimum value;

(b) receiving the image signal and extracting the average value of the image signal levels of each field that belongs to a dark region to be stretched, and outputting the extracted average value as a dark region average value;

(c) extracting a tilt point which delimits the dark region that is stretched using the field minimum value and the dark region average value;

(d) calculating a pre-gradient for stretching the field minimum value to a predetermined value, using the field minimum value and the tilt point;

(e) calculating a gradient by multiplying the pre-gradient by a predetermined gradient gain; and (f) stretching the black level of the image signal using the gradient.

17. The method of claim 16, wherein step (c) comprises:

removing impulse noise present in lines from the image signal, and extracting the line minimum and maximum values of each line from the impulse-noise-free image signal; and low-pass-filtering the line minimum value, extracting the minimum value of the low-pass-filtered line minimum value, and outputting the extracted minimum value as the field minimum value.

18. The method of claim 16, wherein step (a) comprises:

determining whether the image signal level is higher than or equal to the tilt point;

outputting the original image signal if it is determined that the image signal level is higher than or equal to the tilt point; and outputting the image signal whose black level has been stretched if it is determined that the image signal level is lower than the tilt point.

* * * * *

UNITED STATES PATENT AND TRADEMARK OFFICE
CERTIFICATE OF CORRECTION

PATENT NO. : 6,600,519 B1
DATED : July 29, 2003
INVENTOR(S) : Injun Hwang

It is certified that error appears in the above-identified patent and that said Letters Patent is hereby corrected as shown below:

Column 14,
Line 59, please delete "tile point" and insert -- dark region average value --.
Line 62, please insert -- value and the tilt point (iii) calculating a gradient according to a predetermined gradient gain, and stretching the black level of the image signal using the gradient -- after "minimum".
Line 66, please delete "," after "point".

Column 15,
Line 14, please insert -- outputting -- after "and".
Line 19, please delete "removing" and insert -- low-pass filtering the image signal to remove --.
Lines 21-22, please delete "impulse-noise-free" and insert -- low-pass filtered --.

Column 16,
Lines 7 and 48, please delete "(a)" and insert -- (e) --.
Line 18, please insert -- the -- before "minimum".
Line 39, please delete "(c)" and insert -- a --.

Signed and Sealed this

Fourteenth Day of September, 2004

JON W. DUDAS
*Director of the United States Patent and Trademark Office*

UNITED STATES PATENT AND TRADEMARK OFFICE
CERTIFICATE OF CORRECTION

PATENT NO.   : 6,600,519 B1
DATED        : July 29, 2003
INVENTOR(S)  : Injun Hwang It is certified that error appears in the above-identified patent and that said Letters Patent is hereby corrected as shown below:

Column 14,
Line 59, please delete "tilt point" and insert -- dark region average value --.
Line 62, please insert -- value and the tilt point (iii) calculating a gradient according to a predetermined gradient gain, and stretching the black level of the image signal using the gradient -- after "minimum".
Line 66, please delete "," after "point".

Column 15,
Line 14, please insert -- outputting -- after "and".
Line 19, please delete "removing" and insert -- low-pass filtering the image signal to remove --.
Lines 21-22, please delete "impulse-noise-free" and insert -- low-pass filtered --.

Column 16,
Lines 7 and 48, please delete "(a)" and insert -- (e) --.
Line 18, please insert -- the -- before "minimum".
Line 39, please delete "(c)" and insert -- (a) --.

This certificate supercedes Certificate of Correction issued September 14, 2004.

Signed and Sealed this

Sixteenth Day of August, 2005

JON W. DUDAS
*Director of the United States Patent and Trademark Office*